June 25, 1929.  J. MANNY  1,718,657
AUTOMOBILE LIFT
Filed June 26, 1926
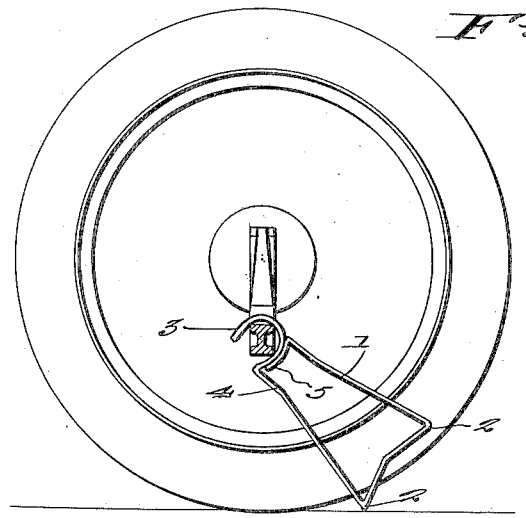
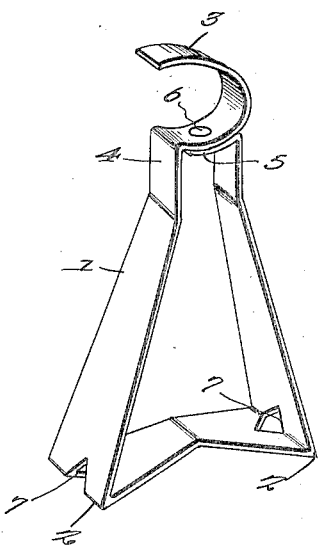
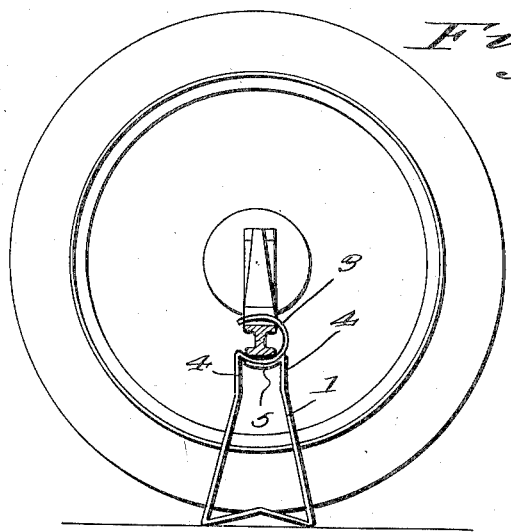
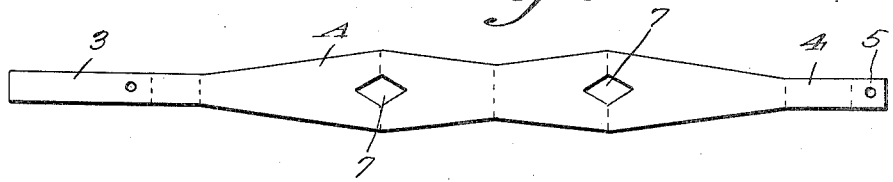
Joseph Manny, INVENTOR
BY Victor J. Evans, ATTORNEY Patented June 25, 1929.

1,718,657

UNITED STATES PATENT OFFICE.

JOSEPH MANNY, OF CONOQUENESSING, PENNSYLVANIA.

AUTOMOBILE LIFT.

Application filed June 26, 1926. Serial No. 118,709.

This invention relates to a lift for motor vehicles and the like, the general object of the invention being to provide a simple device which can be placed under an axle of a vehicle, while in a tilted position, and then the vehicle rocked to cause the device to assume an upright position and thereby lift the axle and raise the wheels off the ground.

Another object of the invention is to form the base of the device with ground engaging parts to prevent the device from slipping when being used and also to provide means for enabling the device to be engaged with an axle.

A further object of the invention is to so form the device that it can be made of a single piece of material.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing how the device is placed in engagement with an axle of a vehicle at the beginning of the lifting operation.

Figure 2 is a similar view showing the device in vertical position and holding the axle with the wheels off the ground.

Figure 3 is a perspective view of the device.

Figure 4 is a view of the blank from which the device is formed.

As shown in these views, the device comprises an upright frame 1 which is formed with a wide base and a narrow top, the base having beveled ends 2 and being ridged so that the ends will engage the road surface or other surface upon which the vehicle rests to prevent the device from slipping during the operation of raising a part of a vehicle. The top is formed with a hook 3 to engage the axle, as shown in Figures 1 and 2.

This device is formed of a single strip of material, as shown at A in Figure 4. The base forming portion has its ends slightly wider than its middle, with the edges gradually sloping from the ends to the middle. The middle is pressed upwardly so as to make the base of ridge shape. The sides of the frame slope upwardly and inwardly and these sides are also of tapered shape, with the small ends uppermost. The top portions of the sides are straight, as shown at 4, and the portion which forms the hook 3 is formed on one side piece and the base of this hook part is fastened to the curved end 5 of the other side part by the rivet 6 or other fastener. Openings 7 are formed in the portions of the strip at the junction of the base with the side pieces so as to provide a plurality of corners at the ends of the base for engaging the road surface or other support to prevent slipping of the device.

The device is arranged adjacent an axle of a vehicle, with its hook 3 engaging the axle and the body in tilted position, as shown in Figure 1, one end of the base engaging the surface upon which the vehicle rests so as to prevent slipping of the device. The vehicle is then pushed in a direction toward the base of the device so that the device will right itself and thus lift the axle and raise the wheels off the ground, as shown in Figure 2.

The device can be manufactured to sell at low cost, it will take but little room in a vehicle and a vehicle can be easily and quickly raised by this device without the use of a jack. The vehicle is simply shoved on to the device and off of the same.

It is thought from the foregoing description that the advantages and novel features of my invention will be readily apparent.

What I claim is:—

A jack formed from a single strip of metal comprising a ridge shape base tapering toward its center, upwardly and inwardly sloping tapered sides formed with the outer edges of said base and terminating at their upper ends in straight parallel portions, said sides being formed with said base in a manner to provide impinging edges formed with openings midway their ends, a hook extending from one straight portion and including superposed curved portions with the upper portion terminating in a line with the end of the lower portion to provide a lateral entrance, and a curved end extending from the other straight portion and being riveted to the lower portion of the hook.

In testimony whereof I affix my signature.

JOSEPH MANNY.